United States Patent
Creamer et al.

(10) Patent No.: US 8,175,250 B2
(45) Date of Patent: *May 8, 2012

(54) DIALED NUMBER SERVICE ROUTING IN A TELEPHONE NETWORK BY REFERENCE TO A DATABASE

(75) Inventors: Thomas Creamer, Boca Raton, FL (US); Victor Moore, Boynton Beach, FL (US); Scott Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 910 days.

This patent is subject to a terminal disclaimer.

(21) Appl. No.: 12/060,639

(22) Filed: Apr. 1, 2008

(65) Prior Publication Data

US 2008/0181386 A1 Jul. 31, 2008

Related U.S. Application Data

(63) Continuation of application No. 10/902,623, filed on Jul. 29, 2004, now Pat. No. 7,471,784.

(51) Int. Cl.
*H04M 7/00* (2006.01)
(52) U.S. Cl. ......... 379/221.09; 379/211.01; 379/211.02; 379/219; 379/221.08; 379/221.12; 379/221.13
(58) Field of Classification Search ............. 379/114.27, 379/221.13, 211.01, 211.02, 219, 221.08, 379/221.09, 221.12
See application file for complete search history.

(56) References Cited

U.S. PATENT DOCUMENTS

| 4,277,649 A | 7/1981 | Sheinbein |
| 5,276,731 A | 1/1994 | Arbel et al. |
| 5,864,612 A | 1/1999 | Strauss et al. |
| 6,327,349 B1 * | 12/2001 | Rollins ............... 379/114.27 |

(Continued)

FOREIGN PATENT DOCUMENTS

WO  WO 03046784  6/2003

OTHER PUBLICATIONS

US Patent No. 7471784, "Dialed Number Service Routing in a Telephone Network by Reference to a Database," Notice of Allowance dated Jul. 24, 2008.

(Continued)

*Primary Examiner* — Ahmad Matar
*Assistant Examiner* — Khai N Nguyen
(74) *Attorney, Agent, or Firm* — Yudell Isidore Ng Russell PLLC

(57) ABSTRACT

In accordance with an improved call routing methodology, a call is routed within a communication network by reference to one or more databases. In response to receiving a local number portability request at a service control point (SCP), the SCP accesses one or more databases to determine whether or not to apply custom call routing to a call directed to a called telecommunications number. In response to determining to apply custom call routing to the call, the SCP performs at least a second access to the one or more databases to obtain a local routing number (LRN) associated within the one or more databases with a calling telecommunications number associated with the call. The SCP thereafter provides the LRN to a service switch point in the communication network so that the call is routed to a called station associated with the called telecommunications number.

24 Claims, 5 Drawing Sheets

U.S. PATENT DOCUMENTS

| | | | |
|---|---|---|---|
| 6,335,927 | B1 | 1/2002 | Elliott et al. |
| 6,553,108 | B1 | 4/2003 | Felger |
| 6,560,226 | B1 * | 5/2003 | Torrey et al. .................. 370/360 |
| 6,628,755 | B2 | 9/2003 | Shimada et al. |
| 6,665,388 | B2 | 12/2003 | Bedingfield |
| 6,668,054 | B1 | 12/2003 | Contino et al. |
| 6,744,868 | B2 | 6/2004 | Mani |
| 6,771,755 | B1 | 8/2004 | Simpson |
| 6,778,647 | B1 | 8/2004 | Dumas |
| 6,853,711 | B2 | 2/2005 | Brisebois et al. |
| 6,975,705 | B2 | 12/2005 | Scherer |
| 6,975,708 | B1 | 12/2005 | Scherer |
| 7,142,653 | B2 | 11/2006 | Creamer |
| 7,215,751 | B2 | 5/2007 | Creamer |
| 7,471,784 | B2 | 12/2008 | Creamer |
| 2002/0168055 | A1 * | 11/2002 | Crockett et al. ........... 379/88.01 |
| 2003/0007621 | A1 | 1/2003 | Graves et al. |
| 2003/0043982 | A1 | 3/2003 | Lee et al. |
| 2003/0046248 | A1 | 3/2003 | Federowicz |
| 2003/0133553 | A1 | 7/2003 | Khakoo et al. |
| 2003/0169866 | A1 | 9/2003 | Williams et al. |
| 2003/0194078 | A1 | 10/2003 | Wood et al. |
| 2004/0047453 | A1 | 3/2004 | Fraser |
| 2004/0096046 | A1 | 5/2004 | Lection et al. |
| 2004/0171372 | A1 | 9/2004 | Tokudome |
| 2005/0069123 | A1 | 3/2005 | Castro et al. |
| 2005/0135591 | A1 | 6/2005 | Creamer |
| 2005/0163299 | A1 | 7/2005 | Creamer |

OTHER PUBLICATIONS

US Patent No. 7142653, "System and Method for Providing Caller Information Across Heterogeneous Networks," Non-Final Office Action dated Sep. 20, 2005.

US Patent No. 7142653, "System and Method for Providing Caller Information Across Heterogeneous Networks," Non-Final Office Action dated Mar. 13, 2006.

US Patent No. 7142653, "System and Method for Providing Caller Information Across Heterogeneous Networks," Notice of Allowance dated Aug. 9, 2006.

US Patent No. 7215751, "System and Method for Processing Caller Information Across Heterogeneous Networks, "Non-Final Office Action dated Sep. 20, 2005.

US Patent No. 7215751, "System and Method for Processing Caller Information Across Heterogeneous Networks, "Non-Final Office Action dated Mar. 13, 2006.

US Patent No. 7215751, "System and Method for Processing Caller Information Across Heterogeneous Networks, "Non-Final Office Action dated Aug. 11, 2006.

US Patent No. 7215751, "System and Method for Processing Caller Information Across Heterogeneous Networks, "Notice of Allowance dated Jan. 8, 2007.

* cited by examiner

| Called Station Number | LRN | Services Available |
|---|---|---|
| 512-123-4567 | | yes |
| 496-823-4567 | 829 | no |
| ... | ... | ... |
| 654-997-7847 | 331 | no |

FIG. 2A

| Called Station Number | LRN |
|---|---|
| 512-123-4567 | 999 |
| 496-823-4567 | 829 |
| ... | ... |
| 654-997-7847 | 331 |

FIG. 2B

| Calling Station Number | Subscriber Name | Address | Alternate Billing | Service Preferences |
|---|---|---|---|---|
| 512-455-1212 | John Doe | 800 Anytown Dr. | 12324356 | Call waiting, caller ID |
| 496-123-4567 | Jane Doe | 500 Anystreet | 989865447 | 3-way calling |
| ... | ... | ... | ... | ... |
| 654-987-4321 | Bob Doe | 310 Court Ave. | 97844675 | Caller ID |

FIG. 3

| Subscriber Name | Service(s) | LRN |
|---|---|---|
| John Doe | EA1, EA2 | 862, 213 |
| Jane Doe | EA1 | 211 |
| ... | ... | ... |
| Bob Doe | EA1, EA2, EA3 | 862, 213, 110 |

FIG. 4

DIALED NUMBER SERVICE ROUTING IN A TELEPHONE NETWORK BY REFERENCE TO A DATABASE

CROSS-REFERENCE TO RELATED APPLICATION

The present application is a continuation to U.S. patent application Ser. No. 10/902,623, filed on Jul. 29, 2004, now U.S. Pat. No. 7,471,784 which is also related to copending U.S. patent application Ser. Nos. 10/763,082 and 10/763,083, which are assigned to the assignee of the present invention and incorporated herein by reference in its entirety.

BACKGROUND OF THE INVENTION

1. Technical Field

The present invention relates in general to communication via a communication network and, in particular, to methods, systems and program products for routing calls in a heterogeneous communication network. Still more particularly, the present invention is related to custom routing calls in a heterogeneous communication network by reference to a database containing user routing preferences.

2. Description of the Related Art

Within the Public Switched Telephone Network (PSTN) calls are routed from calling stations to called stations providing desired services based upon the dialed number. This is the so-called Dialed Number Identification Service (DNIS). For example, a caller at a calling station (e.g., a telephone or computer) may establish a voice and/or data connection to a call center providing support for a product or service by dialing the telephone number assigned to the call center.

With the proliferation of services available via the PSTN and the variety of services provided by individual service providers, one problem experienced by callers is the need to remember an ever expanding number of telephone numbers to access desired services. For example, to obtain telephonic technical support, a caller may have to remember one telephone number for regular business hours and a different second telephone number for after-hours support. Services may be assigned different telephone numbers for different days of the week, different software applications, different languages, etc. Absent the caller remembering the correct telephone number assigned to the service meeting the parameters required by the user at the time service is desired, the user will be unable to access the desired service.

SUMMARY OF THE INVENTION

In view of the foregoing, the present invention provides improved routing of calls requesting services in the PSTN based upon an indication of a user preference within a database.

According to one embodiment, a local number portability request is received at a service control point (SCP). In response to receiving the local number portability request, the SCP accesses one or more databases to determine whether or not to apply custom call routing to a call directed to a called telecommunications number. In response to determining to apply custom call routing to the call, the SCP performs at least a second access to the one or more databases to obtain a local routing number (LRN) associated within the one or more databases with a calling telecommunications number associated with the call. The SCP thereafter provides the LRN to a service switch point in the communication network so that the call is routed to a called station associated with the called telecommunications number.

All objects, features, and advantages of the present invention will be come apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 2A depicts a first exemplary embodiment of a Local Number Portability (LNP) database in accordance with the present invention;

FIG. 2B illustrates a second exemplary embodiment of a Local Number Portability Database (LNP DB) in accordance with the present invention;

FIG. 3 depicts an illustrative embodiment of a Line Information Database (LIDB) in accordance with the present invention;

FIG. 4 illustrates an exemplary embodiment of a Service Routing Database (SRDB) in accordance with the present invention.

DETAILED DESCRIPTION OF ILLUSTRATIVE EMBODIMENT

Figure 1:
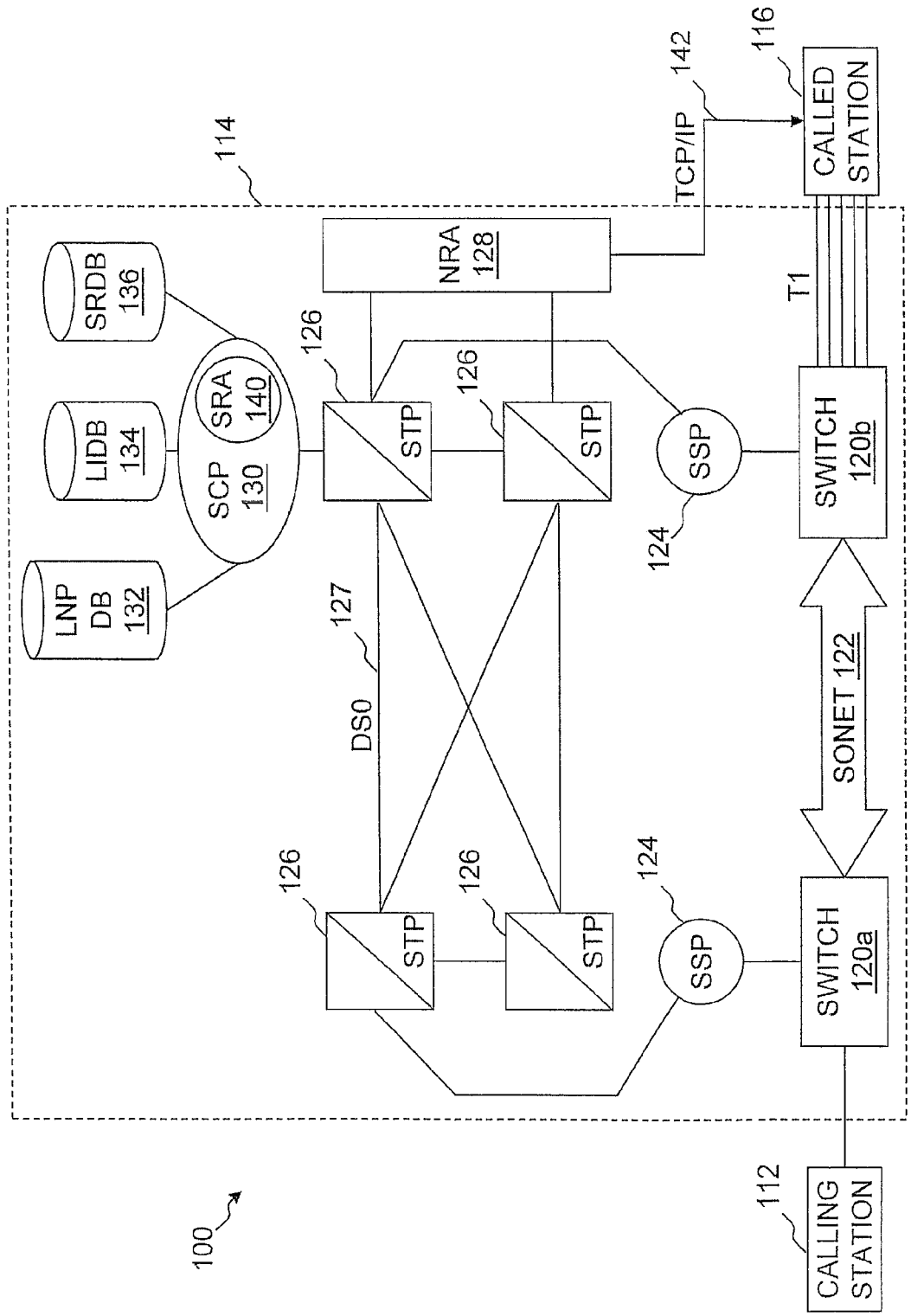
FIG. 1 is a high level block diagram of a heterogeneous communication network in which the present invention may advantageously be employed.

With reference to the figures and in particular with reference to FIG. 1, there is illustrated a high level block diagram of a heterogeneous communication network 100 in which the present invention may advantageously be implemented. As shown, heterogeneous communication network 100 includes a calling station 112, a Public Switched Telephone Network (PSTN) 114, and a called station 116 that are coupled together to permit voice and/or data communication between calling station 112 and called station 116. Each of calling station 112 and called station 116 may be any type of device capable of communication over PSTN 114, including a telephone, a computer, or other communication device. In at least one preferred embodiment, called station 116 comprises a data processing system that executes an enterprise application (EA) to provide a desired service to calling station 112.

As illustrated, PSTN 114 includes a voice network comprising a plurality of voice switches 120 (e.g., 120a and 120b) coupled for voice communication by a circuit-switched communication network such as Synchronous Optical Network (SONET) 122. Generally speaking, switches 120 reside in geographically distributed "central offices" (COs) so that switch 120a resides in a CO geographically near to calling station 112 and switch 120b resides in a CO geographically near to called station 116. Accordingly, switch 120a routes calls to and from calling station 112, and switch 120b routes calls to and from called station 116.

PSTN 114 further includes a parallel SS7 (Signaling System 7) data network that sets up switches 120 to route voice calls and associated data (e.g., Calling Number Identification (CNI)) between calling stations, such as calling station 112, and called stations, such as called station 116. The SS7 network includes a number of Service Switch Points (SSPs) 124, which are each coupled to (or integrated with) a respective switch 120, and a plurality of mutually coupled Signaling Transfer Points (STPs) 126. SSPs 124 comprise local exchanges in the telephone network that communicate with the associated voice switch 120 utilizing standard primitives and that create data packets transmitted within the SS7 network to set up and route voice calls. These data packets are routed within the SS7 network by STPs 126, which in the depicted embodiment, are coupled by Digital Signal Zero (DS0) channels 127.

Coupled to at least one STP 126 within the SS7 network are one or more Service Control Point (SCPs), which in a typical embodiment, each comprise a general purpose server computer system. In a preferred embodiment of the present invention, at least one SCP 130 executes a Service Routing Application (SRA) 140 that controls call routing and service provision in the manner described below with reference to FIG. 5. SRA 140 augments or replaces a conventional Local Number Portability (LNP) application executed by SCP 130. As depicted, SCP 130 and SRA 140 have a number of databases supporting their operation, including Local Number Portability (LNP) Database (DB) 132, Line Information Database (LIDB) 134 and Service Routing Database (SRDB) 136, which are described below.

PSTN 114 further includes a Name Resolution Adapter 128 coupled to one or more STPs 126. NRA 128 retrieves caller attributes, such as name, address, and billing information from LIDB 134, and sends the caller attributes to the EA running on called station 116 over data network 142, which may employ the well-known Transport Control Protocol/Internet Protocol (TCP/IP) protocol suite. A detailed description of the structure and operation of NRA 128 is provided in the copending patent applications incorporated by reference above and is accordingly omitted herein.

Referring now to FIG. 2A, a first exemplary embodiment of a LNP DB 132 in accordance with the present invention is depicted. LNP DB 132 supports the ability of users of telecommunications services to retain, at the same location, existing telecommunications numbers without impairment of quality, reliability, or convenience when switching between telecommunications carriers. LNP DB 132 associates each telecommunications number (of the form NPA-NXX-XXXX) that has been ported with a Local Routing Number (LRN) identifying a local exchange (i.e., SSP 124) serving a called station 116 assigned the called telecommunications number. The LRN thus serves the same function that the NXX portion (i.e., Central Office Code) of the telecommunications number did prior to the implementation of LNP.

As shown, LNP DB 132 of FIG. 2A includes a number of entries 210, 212, 214, which are each associated with a respective called telecommunications number that has been ported. These ported telecommunications numbers are illustrated within FIG. 2A in column 200. As noted above, and as shown in column 202, each entry 210, 212, 214 of LNP DB 132 further specifies the LRN identifying the SSP 124 that now serves the ported telecommunications number.

In addition, each entry 210, 212, 214 of LNP DB 132 is extended in FIG. 2A to include additional information, represented by column 204. In particular, column 204 indicates whether or not custom routed services (as described further below) are available for the called telecommunications number.

Referring now to FIG. 2B, an alternative second exemplary embodiment of LNP DB 132 is illustrated. In the depicted embodiment, column 204 is omitted, and the availability of custom routed services for the called telecommunications number within each of entries 210', 212' and 214' is instead indicated by the LRN given in column 202. Thus, for telecommunications numbers such as that set forth in entry 210' for which custom routed services are available, the LRN is set to a special code 220 (e.g., "999") that is not assigned to any of SSPs 124. For telecommunications numbers for which custom routed services are not available, column 202 of LNP DB 132 specifies the conventional LRN of the serving SSP 124.

With reference now to FIG. 3, there is depicted an exemplary embodiment of a LIDB 134 that, in accordance with the present invention, records attributes associated with the telecommunications numbers of calling stations. As shown, in the depicted embodiment, LIDB 134 takes the form of a table including rows (or entries) 330 through 340, which each corresponds to a unique calling station telecommunications number, and columns 305 through 325.

Column 305 contains the telecommunications numbers of calling stations. Columns 310 and 315 respectively list the subscriber name and address corresponding to the telecommunications numbers set forth in column 305. Thus, the information in columns 305, 310 and 315 provides the information listed in a conventional telephone directory.

Column 320 includes billing information for the telecommunications numbers listed in column 305. For example, a subscriber may have his service charges billed to a credit card number stored within column 320. In this example, a SCP 130 may retrieve billing information from LIDB 134 and provide the billing information to an enterprise application (EA) running on a called station 116 to permit billing for services utilized by the subscriber.

Finally, column 325 includes telecommunications service preference information for the telecommunications numbers listed in column 305. These telecommunications services may include conventional telecommunications services, such as call waiting, call forwarding, and three-way calling, as well as additional telecommunications services.

Referring now to FIG. 4, there is depicted an exemplary embodiment of SRDB 136 in accordance with the present invention. In the exemplary embodiment, SRDB 136, like the above-described databases, is arranged as a table including a plurality of rows 410, 412 and 414, that each corresponds to a respective telecommunications services subscriber (e.g., "John Doe") whose name is listed in column 400. A second column 402 associates with each such subscriber name a listing of custom routed services (e.g., Enterprise Application 1 (EA1), EA2, and EA3) to which the subscriber subscribes. Finally, a third column 404 lists the respective LRN of each custom routed service to which the subscriber subscribes.

It should be noted that, because different subscribers may have different routing preferences, the LRN of the same custom routed service (e.g., EA1) may differ between subscribers, as shown in rows 410 and 412. For example, it may be desirable to assign a service (e.g., live technical support) offered by a called station a single telecommunications number, and yet route calls placed by subscribers to the service differently based upon subscriber preferences, such as the subscriber's native language (e.g., English versus Spanish).

It should also be appreciated that the LRN assigned to a particular service for a particular subscriber may vary over time based upon one or more rule that takes into consideration time of day, day of the week, or a calendar or software application preference. Considering the example of a called station offering live technical support for subscribers in the continental United States, it may be desirable to route to a call center in California calls to the service placed during the hours of 6 a.m. to 6 p.m. PST and then route to a call center in India calls to the service placed during the hours of 6 p.m. to 6 a.m. PST. Advantageously, all such calls, regardless of when made and where ultimately routed and terminated, may be made to the same called number.

Those skilled in the art will appreciate that although SRDB 136 is illustrated and described herein as a separate database from LNP DB 132 and LIDB 134, SRDB 136 may be alternatively be implemented as a portion of LIDB 134 or another database accessible via PSTN 114.

Figure 5:
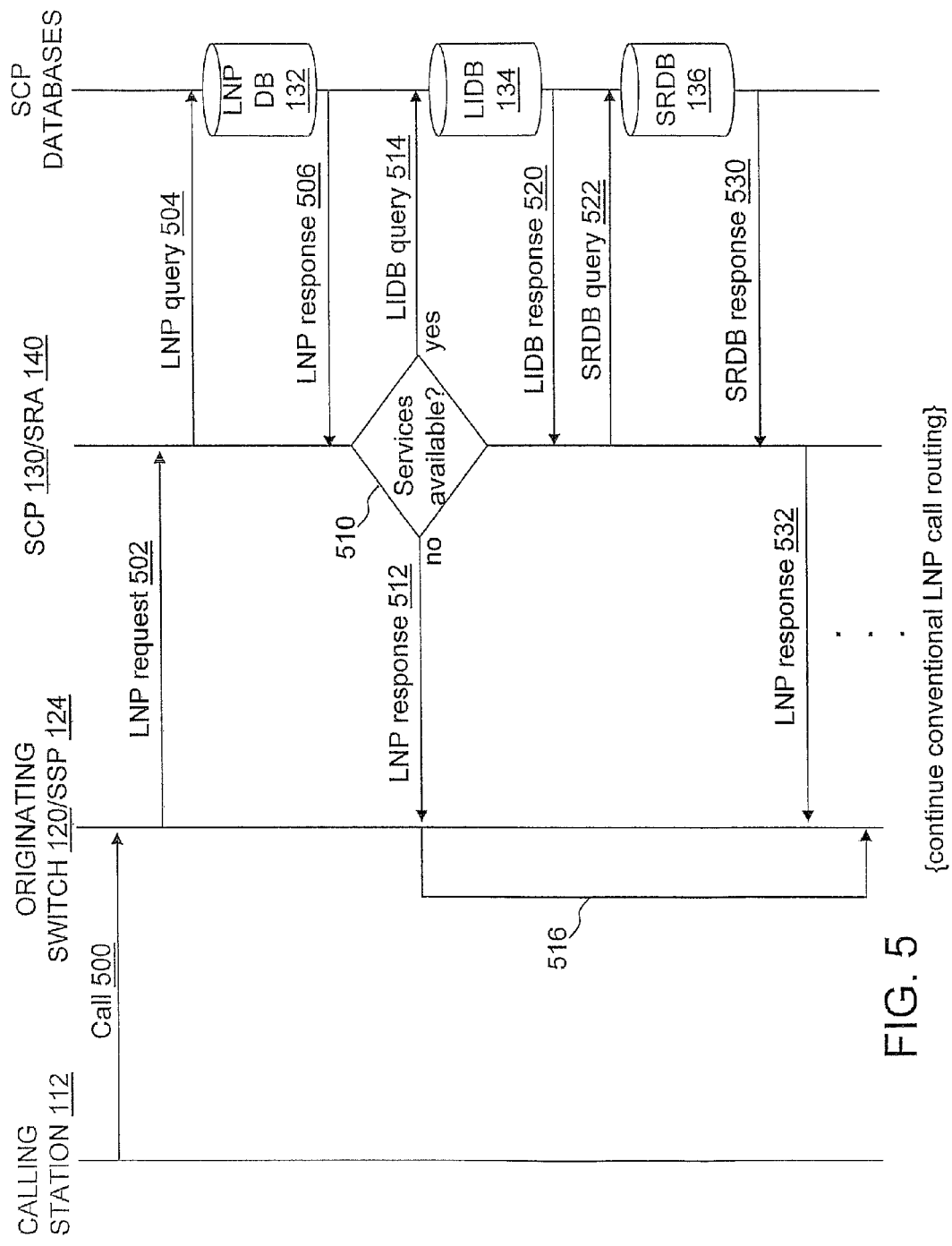
FIG. 5 is a time-space diagram of an exemplary call flow in which a call originated by a calling station is routed within a PSTN to a called station by reference to an indication of a user routing preference stored within a database, such as the SRDB.

With reference now to FIG. 5, there is illustrated a time-space diagram illustrating a call flow in accordance with the present invention. As depicted, a subscriber at calling station 112 first originates a call 500, for example, by dialing the telecommunications number assigned to a desired service, such as a live technical support service. As described above, call 500 is generally received and handled by the switch 120a (i.e., the originating switch) and associated SSP 124 geographically proximate to calling station 112.

In response to receipt of call 500, the SSP 124 associated with switch 120a generates and transmits to SCP 130 a LNP request 502 that requests the LRN of the called telecommunications number. As will be appreciated by those skilled in the art, SSP 124 may access a local routing table prior to transmitting LNP request 502 to ensure that at least one telecommunications number having the same NXX portion (i.e., Central Office Code) as the called telecommunications number has been ported and that the LNP request 502 is therefore required.

In response to receipt of LNP request 502 at SCP 130, SRA 140 generates and transmits to LNP DB 132 a LNP query 504 that requests the LRN associated by LNP DB 132 with the NXX portion of the called telecommunications number. In response to LNP query 504, LNP DB 132 replies with a LNP response 506 containing an indication of whether or not custom routed services are available for the called telecommunications number. That is, if the embodiment of LNP DB 132 given in FIG. 2A is implemented, LNP response 506 may contain the LRN specified in column 202 if custom routed services are not available for the called telecommunication number and a "Yes" indication if custom routed services are available. Alternatively, if the embodiment of LNP DB 132 given in FIG. 2B is implemented, LNP response 506 may simply specify the LRN or special code (e.g., "999") set forth in column 202.

In response to receipt of LNP response 506, SRA 140 determines by reference to the indication within LNP response 506 whether or not custom routed services are available for the called telecommunications number. This determination is represented by decision block 510. If custom routed services are not available, SRA 140 generates and transmits to the SSP 124 associated with originating switch 120a a conventional LNP response 512 containing the LRN of the called telecommunications number. As indicated by arrow 516, the SSP 124 thereafter routes call 500 to the called telecommunications number in accordance with the conventional LNP protocol.

Returning to decision block 510, if SRA 140 determines from LNP response 506 that custom routed services are available for the called telecommunications number, SRA 140 then issues a LIDB query 514 to LIDB 134 requesting one or more attributes associated with the telecommunications number of calling station 112. In a presently preferred embodiment, these one or more requested attributes include the subscriber name associated with the telecommunications number of calling station 112.

In response to receipt of LIDB query 514, LIDB 134 returns to SRA 140 a LIDB response 134 containing the requested attribute(s) associated with the telecommunications number of calling station 112. The subscriber name is preferably presented as one of these attributes in the form of a text string.

In response to receipt of LIDB response 520, SRA 140 then utilizes a selected attribute associated with the calling telecommunications number (e.g., the subscriber name) as an index to access SRDB 136 to determine the custom routing that should be applied to call 500. Accordingly, SRA 140 generates and transmits to SRDB 136 a SRDB query 522 containing an index attribute associated with the calling telephone number (e.g., the subscriber name), and if more than one service is supported per index attribute, a service identification (e.g., "999" for EA1) obtained from LNP DB 132. In response to SRDB query 522, SRDB 136 returns a SRDB response 530 containing the LRN associated by SRDB 136 with the index attribute (and service identification, if included) specified within SRDB query 522.

Now having the LRN specified within SRDB 136, SRA 140 generates and transmits to the SSP 124 associated with originating switch 120a a LNP response 532 containing the LRN of the switch 120b serving the called station 116 providing the requested service. In response to receipt of LNP response 532, the SSP 124 associated with switch 120a implements custom routing of call 500 by generating and transmitting via the SS7 data network additional conventional LNP messages to route call 500 to switch 120b and ultimately to called station 116. Because these additional messages are entirely conventional, they are omitted from FIG. 5 and not described further herein.

As has been described, the present invention provides methods, systems and program products that support custom routing of calls within a heterogeneous communication network in accordance with user preferences specified in a telephony database. The present invention advantageously leverages and extends existing LNP functionality to provide such custom routing in a manner that maintains existing PSTN interfaces and is therefore transparent to entities within the PSTN.

While the invention has been particularly shown as described with reference to a preferred embodiment, it will be understood by those skilled in the art that various changes in form and detail may be made therein without departing from the spirit and scope of the invention. For example, it will be appreciated that in alternative embodiments of the present invention, SRDB could alternatively associate LRNs with respective calling telecommunications numbers. In such embodiments, access to the LIDB to obtain a subscriber's name may be omitted, and the calling telecommunications number itself could be utilized as an index into the SRDB to determine what custom routing to apply to a call. In other alternative embodiments, the LIDB could be augmented to include the information contained in the SRDB, and the SRDB could be eliminated. In such embodiments, the calling communications number could again be employed as an index to determine the custom routing (i.e., LRN) to apply to a call.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of routing a call in a communication network by reference to one or more databases, said method comprising:
    in response to receiving a local number portability request at a service control point (SCP), the SCP accessing said one or more databases to determine whether or not to apply custom call routing in connecting the call from a calling station associated with a calling telecommunications number to a called station associated with a called telecommunications number;
    in response to determining to apply custom call routing to the call, the SCP:
        performing at least a second access to said one or more databases to obtain a local routing number (LRN) associated within said one or more databases with the calling telecommunications number associated with said call, and
        providing the LRN to a service switch point in the communication network so that the call is routed to the called station associated with the called telecommunications number by a first route; and
    in response to determining to not apply custom call routing to the call, the SCP not providing the LRN to the service switch point in the communication network so that the call is routed to the called station associated with the called number by a second route.

2. The method of claim 1, wherein accessing said one or databases to determine whether or not to apply custom call routing to the call comprises:
    querying a local number portability (LNP) database with a LNP query; and
    receiving, in a LNP response from the LNP database, an indication of whether or not to apply custom call routing to the call.

3. The method of claim 2, wherein receiving from the LNP database the indication of whether or not to apply custom call routing to the call comprises receiving the indication as a non-LRN code provided in place of a local routing number (LRN).

4. The method of claim 1, wherein performing at least the second access comprises:
    performing the second access to said one or more databases to obtain an index attribute associated with said calling telecommunications number; and
    performing a third access to said one or more databases utilizing said index attribute to obtain said LRN.

5. The method of claim 4, wherein performing the third access utilizing said index attribute comprises performing the third access utilizing a subscriber name as said index attribute.

6. The method of claim 1, wherein providing the LRN to the service switch point in the communication network comprises providing the LRN to the service switch point associated with a switch serving the calling station that originated the call.

7. A data processing system for routing a call in a communication network by reference to one or more databases, said data processing system comprising:
    data processing hardware; and
    a service routing application executed by said data processing hardware to cause the data processing system to perform:
        responsive to receipt of a local number portability request, accessing said one or more databases to determine whether or not to apply custom call routing in connecting the call from a calling station associated with a calling telecommunications number to a called station associated with a called telecommunications number;
        responsive to determining to apply custom call routing to the call:
            performing at least a second access to said one or more databases to obtain a local routing number (LRN) associated within said one or more databases with the calling telecommunications number associated with said call, and
            providing the LRN to a service switch point in the communication network so that the call is routed to the called station associated with the called telecommunications number; and
        responsive to determining to not apply custom call routing to the call, not providing the LRN to the service switch point in the communication network so that the call is routed to the called station associated with the called number by a second route.

8. The data processing system of claim 7, wherein:
    said one or databases include a local number portability (LNP) database;
    said service routing application queries said local number portability (LNP) database with a LNP query and receives, in a LNP responses from the LNP database, an indication of whether or not to apply custom call routing to the call.

9. The data processing system of claim 8, wherein the indication of whether or not to apply custom call routing comprises a non-LRN code provided in place of the LRN.

10. The data processing system of claim 7, wherein:
    the service routing application performs the second access to said one or more databases to obtain an index attribute associated with said calling telecommunications number and performs a third access to said one or more databases utilizing said index attribute to obtain said LRN.

11. The data processing system of claim 10, wherein said index attribute comprises a subscriber name.

12. The data processing system of claim 7, wherein said service routing application provides the LRN to the service switch point associated with a switch serving the calling station that originated the call.

13. A program product for routing a call in a communication network by reference to one or more databases, said program product comprising:
    a machine-readable storage device; and
    a service routing application stored within said machine-readable storage device, wherein said service routing application, when executed by a machine, cause the machine to perform:
        responsive to receipt of a local number portability request, accessing said one or more databases to determine whether or not to apply custom call routing in connecting the call from a calling station associated with a calling telecommunications number to a called station associated with a called telecommunications number;

responsive to determining to apply custom call routing to the call:

performing at least a second access to said one or more databases to obtain a local routing number (LRN) associated within said one or more databases with the calling telecommunications number associated with said call, and providing the LRN to a service switch point in the communication network so that the call is routed to a called station associated with the called telecommunications number; and responsive to determining to not apply custom call routing to the call, not providing the LRN to the service switch point in the communication network so that the call is routed to the called station associated with the called number by a second route.

14. The program product of claim 13, wherein:
said one or databases include a local number portability (LNP) database;
said service routing application queries said local number portability (LNP) database with a LNP query and receives, in a LNP responses from the LNP database, an indication of whether or not to apply custom call routing to the call.

15. The program product of claim 14, wherein the indication of whether or not to apply custom call routing comprises a non-LRN code provided in place of the LRN.

16. The program product of claim 13, wherein:
the service routing application performs the second access to said one or more databases to obtain an index attribute associated with said calling telecommunications number and performs a third access to said one or more databases utilizing said index attribute to obtain said LRN.

17. The program product of claim 16, wherein said index attribute comprises a subscriber name.

18. The program product of claim 13, wherein said service routing application provides the LRN to the service switch point associated with a switch serving calling station that originated the call.

19. The method of claim 1, wherein:
said one or more databases associate a plurality of different services with the calling telecommunications number and associate with each of the plurality of services a respective one of a plurality of different LRNs;
the plurality of different LRNs includes the LRN;
accessing said one or more databases to determine whether or not to apply custom call routing includes obtaining a particular service identification for the call among a plurality of different service identifications each identifying a different telecommunications service; and
performing at least the second access includes obtaining the LRN associated with the particular service identification from among the plurality of different LRNs.

20. The data processing system of claim 7, wherein:
said one or more databases associate a plurality of different services with the calling telecommunications number and associate with each of the plurality of services a respective one of a plurality of different LRNs;
the plurality of different LRNs includes the LRN;
accessing said one or more databases to determine whether or not to apply custom call routing includes obtaining a particular service identification for the call among a plurality of different service identifications each identifying a different telecommunications service; and
performing at least the second access includes obtaining the LRN associated with the particular service identification from among the plurality of different LRNs.

21. The program product of claim 13, wherein:
said one or more databases associate a plurality of different services with the calling telecommunications number and associate with each of the plurality of services a respective one of a plurality of different LRNs;
the plurality of different LRNs includes the LRN;
accessing said one or more databases to determine whether or not to apply custom call routing includes obtaining a particular service identification for the call among a plurality of different service identifications each identifying a different telecommunications service; and
performing at least the second access includes obtaining the LRN associated with the particular service identification from among the plurality of different LRNs.

22. The method of claim 1, wherein accessing said one or more databases to determine whether or not to apply custom call routing includes accessing the one or more databases with the called telecommunications number of the call to determine whether or not to apply custom call routing.

23. The data processing system of claim 7, wherein accessing said one or more databases to determine whether or not to apply custom call routing includes accessing the one or more databases with the called telecommunications number of the call to determine whether or not to apply custom call routing.

24. The program product of claim 13, wherein accessing said one or more databases to determine whether or not to apply custom call routing includes accessing the one or more databases with the called telecommunications number of the call to determine whether or not to apply custom call routing.

* * * * *